United States Patent [19]

Blaze

[11] Patent Number: 5,721,777

[45] Date of Patent: Feb. 24, 1998

[54] ESCROW KEY MANAGEMENT SYSTEM FOR ACCESSING ENCRYPTED DATA WITH PORTABLE CRYPTOGRAPHIC MODULES

[75] Inventor: Matthew A. Blaze, Jersey City, N.J.

[73] Assignee: Lucent Technologies Inc., Murray Hill, N.J.

[21] Appl. No.: 366,084

[22] Filed: Dec. 29, 1994

[51] Int. Cl.⁶ .................................................. H04L 9/00
[52] U.S. Cl. ........................... 380/4; 380/23; 380/25; 380/49
[58] Field of Search .......................... 380/4, 5, 21, 23, 380/25, 49

[56] References Cited

U.S. PATENT DOCUMENTS

| | | | |
|---|---|---|---|
| 4,271,482 | 6/1981 | Giraud | 380/25 X |
| 4,599,489 | 7/1986 | Cargile | 380/4 |
| 5,033,084 | 7/1991 | Beecher | 380/4 |
| 5,199,066 | 3/1993 | Logan | 380/4 |
| 5,436,972 | 7/1995 | Fischer | 380/25 |

OTHER PUBLICATIONS

"Key Management in an Encrypting File System", Proc. Summer 1994 USENIX Technical Conference, Boston, MA, Jun., 1994. Author: Matthew A. Blaze.

Primary Examiner—Bernarr E. Gregory
Attorney, Agent, or Firm—Henry T. Brendzel; Gregory C. Ranieri

[57] ABSTRACT

A cryptographic module, such as a smartcard, is designed to a) store decrypting software programs, and information indicative of predetermined conditions under which an escrow agent is enabled to use the software programs stored on the module to decrypt encrypted data files, and b) records for audit purposes, information indicating every time the software programs are used for decryption.

18 Claims, 6 Drawing Sheets

ESCROW KEY MANAGEMENT SYSTEM FOR ACCESSING ENCRYPTED DATA WITH PORTABLE CRYPTOGRAPHIC MODULES

TECHNICAL FIELD

This invention relates to data processing and, more particularly to a system for accessing encrypted data with portable cryptographic modules.

BACKGROUND OF THE INVENTION

As distributed computing systems grow in size, complexity and variety of application, the problem of protecting sensitive data from unauthorized disclosure and tampering becomes increasingly important. Cryptographic techniques have played and continue to play an important role in protecting communications links and stored data by limiting access only to individuals who hold the proper key. In the case of stored data, however, the routine use of encryption facilities often places the organizational requirements of information security in opposition to those of information management. Since secure encryption implies that only the holders of the cryptographic key have access to the cleartext data, an organization may be denied the use of its own critical business records if the key used to encrypt these records becomes unavailable (e.g., through the death of the key holder).

Existing technology provides two main solutions to address the problem of ensuring secure access to critical data files when the only persons who know the keys to those files are unavailable. One solution is to provide a central file encryption key distribution service similar to the procedures used for controlling physical locks and keys. With this solution, any time a user requires an encryption key, it is generated by a central service, which also keeps a copy for emergency access. In practice, however, the central key distribution system presents major drawbacks and raises certain security concerns. For example, the central service must be unconditionally trusted by all who obtain keys from it. No further controls preclude or audit access by those with access to the key database. Moreover, once a copy of the key database has leaked, all files with keys in the database must be considered compromised forever. Furthermore, a central service can quickly become a service bottleneck or worse, a single point of failure or attack.

An alternative solution reverses the relationship and provides a controlled mechanism for users to deposit copies of their keys for emergency use as needed. The keys for crucial files could thereby be "escrowed" with a trusted caretaker who would reveal them only when certain conditions are met, such as when encrypted business data are required after the death of the legitimate key holder. This solution, called "escrow-deposit", has the benefit of allowing the key holder to generate keys in the usual manner, without direct interaction with a third party. There is no central service bottleneck, since the escrow agent is not directly involved in the creation of new keys. To prevent complete reliance on the caretaker's honesty, the key could be multiply encrypted with more than one caretaker's key, split among several escrow agents (in the manner of the US Escrowed Encryption Standard) or encrypted using a group-oriented public key protocol. Unfortunately, this solution presents certain logistical drawbacks when, for example, one of the escrow agents is unavailable or the public key is compromised.

Both of the above key escrow solutions suffer from a fundamental flaw that after an escrow agent "opens" the key and learns its value, no further controls on its use are possible. Anyone who learns the keys can use them at any time in the future without detection. Electronic escrow is particularly hard to revoke or audit, since it is difficult to ensure that all copies of the keys have been destroyed when the escrow period ends—even if the keys have never actually been used—because backups or illicit copies of the escrow data could have been made.

SUMMARY OF THE INVENTION

The present invention is directed to a cryptographic key management system for a cryptographic module, such as a smartcard which a) stores information indicative of predetermined conditions under which an escrow agent is enabled to use the module to decrypt encrypted data files, and b) records for audit purposes, information indicating every time the module is used for decryption.

In an embodiment of the principles of the invention, a portable cryptographic module is configured to store programmed instructions whose execution grants access to cleartext data files stored in encrypted form in a computer system. The programmed instructions may impose limitations, for example, on either the scope of information that is accessible to an escrow agent using the module or, a time/date interval within which encrypted data files can be retrieved in cleartext form.

The programmed instructions are also designed to store in a tamper-resistant medium embedded in the module all transactional activities involving the use of the cryptographic module. Transactional activity information stored in the module includes data indicative of a) the number of times the module was used, and b) the time and date of each instance of the module's use. The information stored in the tamper-resistant medium can be queried by authorized parties to determine use of the module and the duration of such use.

DETAILED DESCRIPTION

Figure 1:
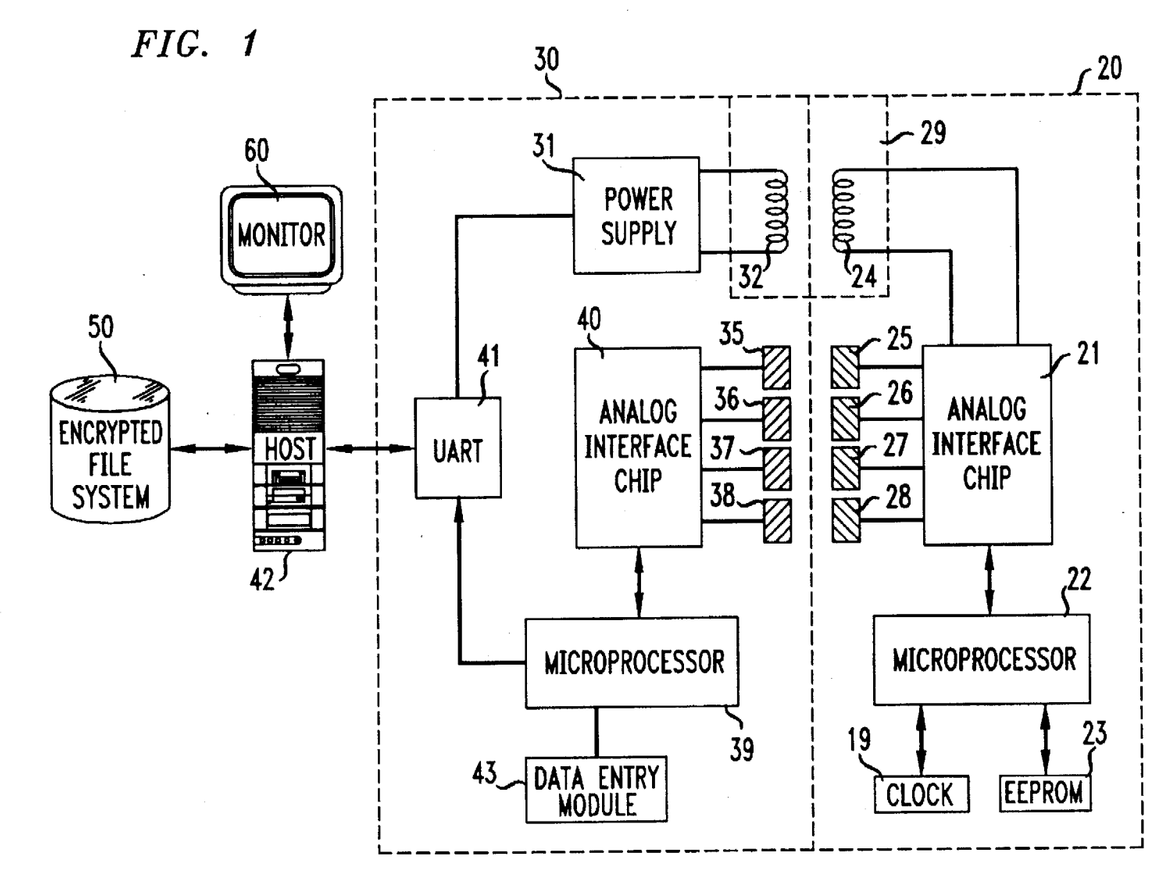
FIG. 1 is an illustrative representation of the major functional components of a portable cryptographic module and its interaction with a module reader and a computer system.

FIG. 1 illustrates in block diagram format a modular encrypting system designed in accordance with the principles of the invention. The block diagram of FIG. 1 shows three main components, namely a portable encrypting module or smartcard 20, a card reader/writer 30 and a host 42. At a general level, when smartcard 20 is coupled to card reader/writer 30 and a valid escrow key is provided, smartcard 20 is able to decrypt data files stored in host 42 which executes the necessary software programs for accessing the memory in the smartcard in order to enable retrieval and decryption of those data files.

Major components of smartcard 20 include a microprocessor 22, an erasable electronic programmable read-only memory (EEPROM) 23, an analog interface chip 21, the inductive coil 24 of a transformer 29, and capacitive plates 25 through 28. All smartcard components are preferably laminated beneath the smartcard surface such that no external contacts are accessible to intruders. The microprocessor 22 has a central processing unit and internal memory units (not shown) that store the firmware for an operating system. The internal memory units of microprocessor 22 store a) protocols for smartcard 20 to receive and transmit data, b) security and application control software, and c) memory management programs. Operating under the control of the firmware, microprocessor 22 executes instructions stored in EEPROM 23 to format data that is transferred to host 42 via the card reader/writer 30. The microprocessor 22 also interprets programmed instructions received from host 42 through the card reader/writer 30, as described in further detail below. Alternatively, the data formatting tasks may be performed by custom application specific integrated circuit embedded in microprocessor 22. An Intel Corporation microprocessor listed as Pan No. 80C51 may be used for microprocessor 22 with the proper programming.

Also shown in smartcard 20 is a clock 19 that is connected to microprocessor 22. Clock 19 is a battery-powered real-time clock that is arranged to time-stamp every instance that the smartcard is used and the duration of such use. Clock 19 is also used by microprocessor 22 to determine when and/or if certain programmed instructions can be executed. For example, host 42 may store on the memory of microprocessor 22 particular software programs to schedule execution of specific programmed instructions at some future date. Alternatively, those programs may enable or disable a cryptographic key after some particular date or within particular date/time interval.

All input to, and output from, smartcard 20 is channeled to analog interface chip 21 which transfers information to and from microprocessor 22 and distributes electrical power from the card reader/writer 30 to the smartcard 20. Specifically, when analog interface chip 21 receives power through the mating of inductive coils 24 and 32 of transformer 29, analog interface chip 21 conditions the electrical power before distributing it to microprocessor 22. Likewise, clock recovery and signal conditioning is performed by analog interface chip 21 for data transferred thereto via the mating of capacitive plates 25, 26, 27 and 28 of smartcard 20 to capacitive plates 35, 36, 37 and 38 of card reader/writer 30.

In addition to the components of card reader/writer 30 already described above with respect to electrical power and data transfer features of smartcard 20, card reader/writer 30 also includes a power supply 31, a universal asynchronous receiver transmitter (UART) 41, a microprocessor 39 and analog interface circuit 40. Some of the components in the smartcard 20 are also used in the card reader/writer 30. For example, the same physical microprocessor can be used for both microprocessor 22 and 39 and the data transfer features of analog interface chip 21 and 42 are almost identical. Power supply 31 provides electrical power to card reader/writer 30 and smartcard 20 when the latter is coupled to the former. Power supply 31 also synchronizes a clock signal from the card reader/writer 30 to the smartcard 20 through the transformer 29. The UART 41 is primarily a physical interface that is arranged to receive and transmit asynchronous data according to a specific standard. UART 41 communicates clock synchronization signals to power supply 31 and transfers data received from host 42 to microprocessor 39 and likewise, transmits data received from microprocessor 39 to host 42. Connected to microprocessor 39 is a data module 43 which is used by a user to enter data input for use by smartcard 20. For example, data module 43 may be used by a user to provide a passphrase or an escrow key that may be verified by microprocessor 22 of smartcard 20. Host 42 is a general purpose computer that executes software programs stored in encrypted file system 50. Chief among those software programs are encryption algorithms that allow cleartext data to be convened to unintelligible output that can only be transformed back to cleartext data by means of a decryption algorithm that is stored in this example in smartcard 20.

A well-known software program to encrypt data files is the UNIX-based cryptographic file system (CFS) which allows a user to associate specific cryptographic keys with particular directories or data files. Basically, Host 42 executing CFS provides a mechanism to associate "real" directories (on other file systems) that contain encrypted data with temporary "virtual" names through which users can read and write cleartext. When users create encrypted directories on regular file systems (e.g., in their home directories), host 42 creates the directory and assigns to it a cryptographic "passphrase" that will be used to encrypt its contents. Cleartext is read and written under the virtual directory, but the files are stored in encrypted form (with encrypted names) in the real directory. In order to establish a difference between users playing different roles, hereinafter a user who created one or more files is called an "owner" and the caretakers of escrowed keys are called "escrow agents." It will be appreciated that CFS is described herein by way of example, but not limitation, since the techniques described here are applicable to any file encryption system.

In addition to software programs, encrypted file system 50 also store binary data arranged under a selected file structure. The stored binary data can be used by a wide variety of applications ranging from voice, data and video communications to traditional management information systems.

Figure 2:
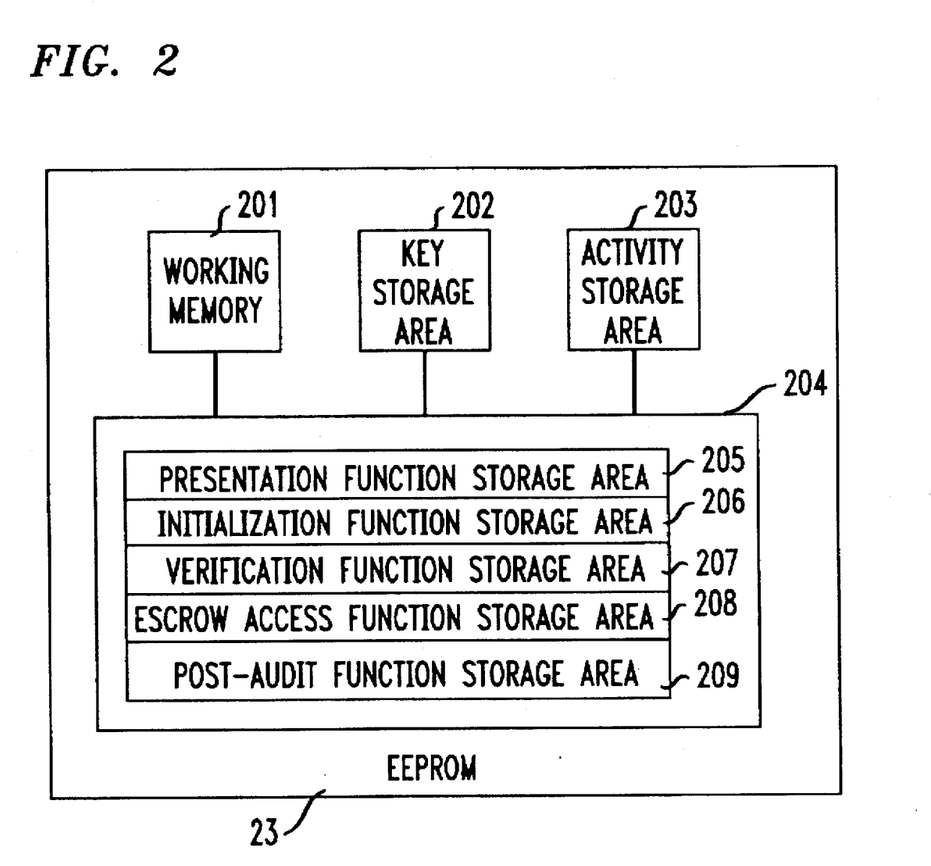
FIG. 2 depicts an exemplary representation of an area map of one of the memories in the portable cryptographic module of FIG. 1.

FIG. 2 shows an illustrative arrangement for storing information in the EEPROM 23 of FIG. 1. Included in FIG. 2 are a) secure storage areas comprised of working memory 201, key storage area 202 and activity storage area 203, and b) operation storage area 204 comprised of function storage areas 205 to 209.

Working memory 201 is a temporary storage area in which data are swapped in and out during the invocation and execution of the programmed instructions contained in function storage areas 205 to 209. Key storage area 202 contains, in binary format, the cryptographic programmed instructions, the file system key, the audit key and a field called "check_word" that is used by an escrow agent to assess the validity of a smartcard received from an owner. The "file system key" is used for actual file data encryption and consists, in the exemplary case of CFS, of two 56 bit DES keys derived from an owner-selected secret "passphrase." The file system key is also used to hash a known plaintext string that is stored in a file called "check file" of encrypted file system 50, as described in detail below. After the programmed instructions contained in initialization function storage area 206 are performed, key storage area 202 also contains the encrypted escrow key and the encrypted audit key. The escrow key is used to encrypt the file system key stored in the smartcard. Once smartcard 20 is initialized and keys are assigned, smartcard 20 may be turned over to an escrow agent for safekeeping. For an escrow agent to use smartcard 20, the escrow key passphrase must be revealed to the escrow agent Activity storage area 203 keeps a log of times and dates at which the programmed instructions in function storage area 207 are executed. Because clock 19 in FIG. 1 has limited storage space, it transmits all data associated with time-stamping to EEPROM 23 which stores that information in activity storage area 203. Activity storage area 203 also contains a counter which is incremented every time that the programmed instructions contained in function storage area 207 are executed to decrypt data. Although FIG. 2 shows only a configuration for only one escrow key, it is possible to configure a smartcard for more than one escrow key. In such a case, a separate key storage area and activity storage area is provided for each escrow key. When multiple escrow keys are used with smartcard 20, transactional activities are recorded in the storage area associated with that key.

Alternatively activity storage area 203 may store only a summary of transactional activity data. For example, activity data associated only with the first and last time smartcard 20 was used to decrypt encrypted data. In this case, the last transactional activity record will be overwritten with each subsequent use of smartcard 20. In addition, smartcard 20 may be disabled after a predetermined usage threshold has been reached, as measured by the counter.

Function storage areas 205 to 209 contain programmed instructions to perform certain operations on smartcard 20. Those operations include card initialization, card verification, escrow access, post-audit, and function selection. The latter operation allows a file owner or an escrow agent to select one of the other operations to be performed. Thus, when smartcard 20 is inserted in card reader/writer 30 of FIG. 1, the instructions contained in presentation function storage area 205 are automatically invoked. Specifically, the execution of these instructions trigger host 42 to send to presentation function storage area 205 an indication of which of the four functions 206, 207, 208, and 209 can be executed and the parameters required for the appropriate functions. The choice of functions may be presented on monitor 60 as a menu to a file owner or an escrow agent who is limited solely to those functions in the use of smartcard 20.

Figure 3:
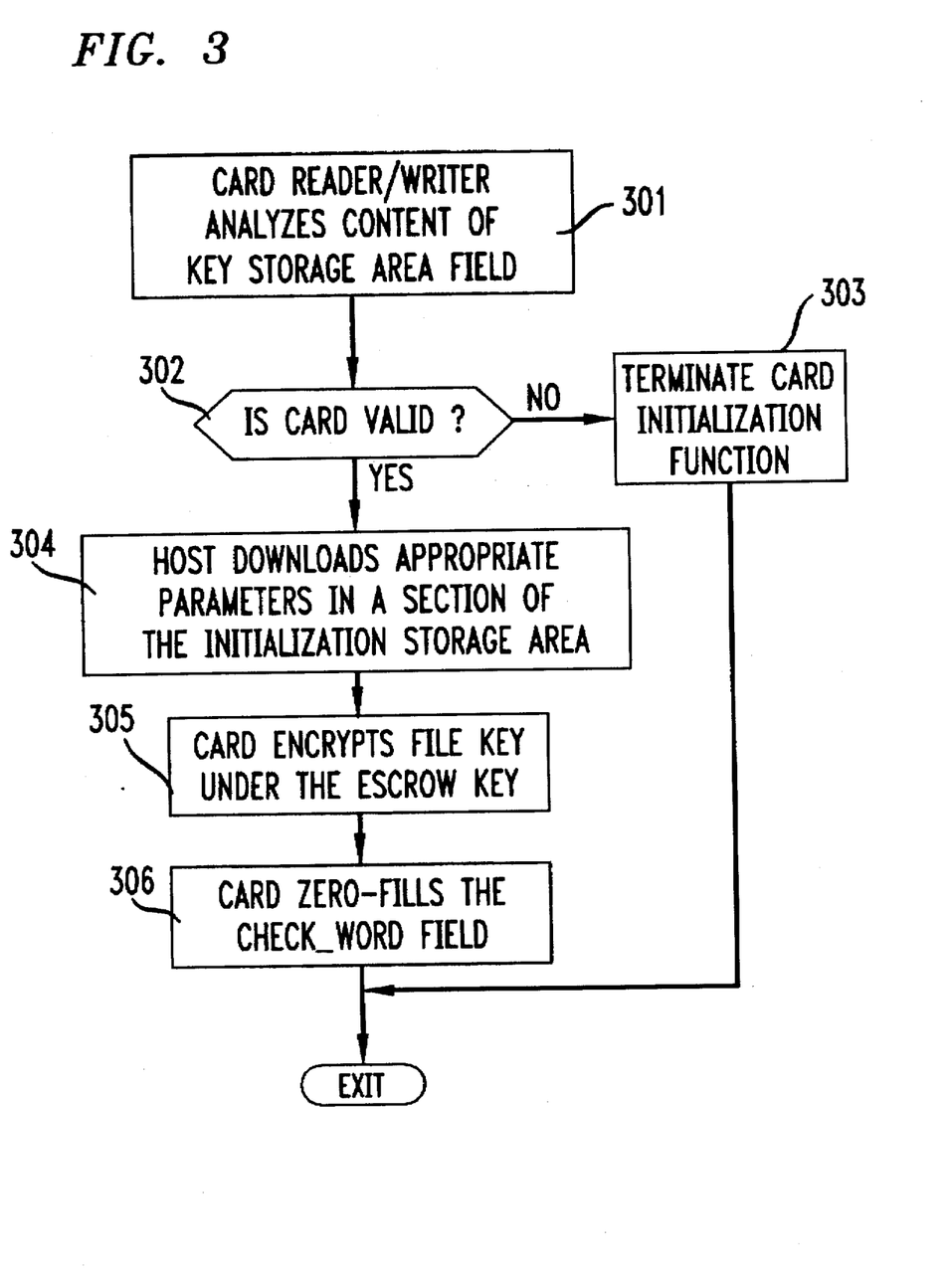
FIGS. 3, 4, 5 and 6 are flowcharts illustrating step-by-step methods that may be used to implement the principles of the invention.

When the initialization function is selected, the programmed instructions contained in function storage area 205 are executed to implement a step-by-step method for that function. This method is shown in FIG. 3 and is initiated in step 301 when card reader/writer 30 reads the contents of key storage area 202. In step 302, a determination is made as to the validity of smartcard 20. This step is performed by verifying, for example, that the content of key storage area 202 is either empty or filled with zeroes. The initialization function is automatically terminated if the smartcard is invalid, as indicated in step 303. This situation may occur, for example, if EEPROM 23 is inoperative due to manufacturing defects. When smartcard 20 is valid, host 42, in step 304, selects the appropriate parameters for the initialization function and downloads those parameters to a specific section in the initialization function storage area 206. Those parameters include the file key and the escrow key. Upon receiving those parameters, smartcard 20, in step 305, encrypts the file key under the escrow key. Specifically, smartcard 20 stores the file key in an encrypted format, based on the escrow key received from host 42. Thereafter, in step 306, smartcard 20 stores, for example, all zeros in encrypted format under the file key in a check_word field in key storage area 202. Optionally, once the initialization function has been performed by an owner of encrypted data files, the initialization function can be removed as an option in the menu of functions presented to escrow agents. Additionally, a file owner may limit the functions that can be performed by one or more escrow agents who have access to smartcard 20. For example, the escrow key of an agent may allow the agent access to the escrow access function while preventing access to other functions, such as the post-auditing function. Conversely, the escrow key of an employee, such as an Electronic Data Processing (EDP) auditor may allow the employee to perform the post-auditing function while denying the employee access to the escrow access function. Thus, the same smartcard 20 may be used by two separate individuals with two separate escrow keys to perform separate functions.

Figure 4:
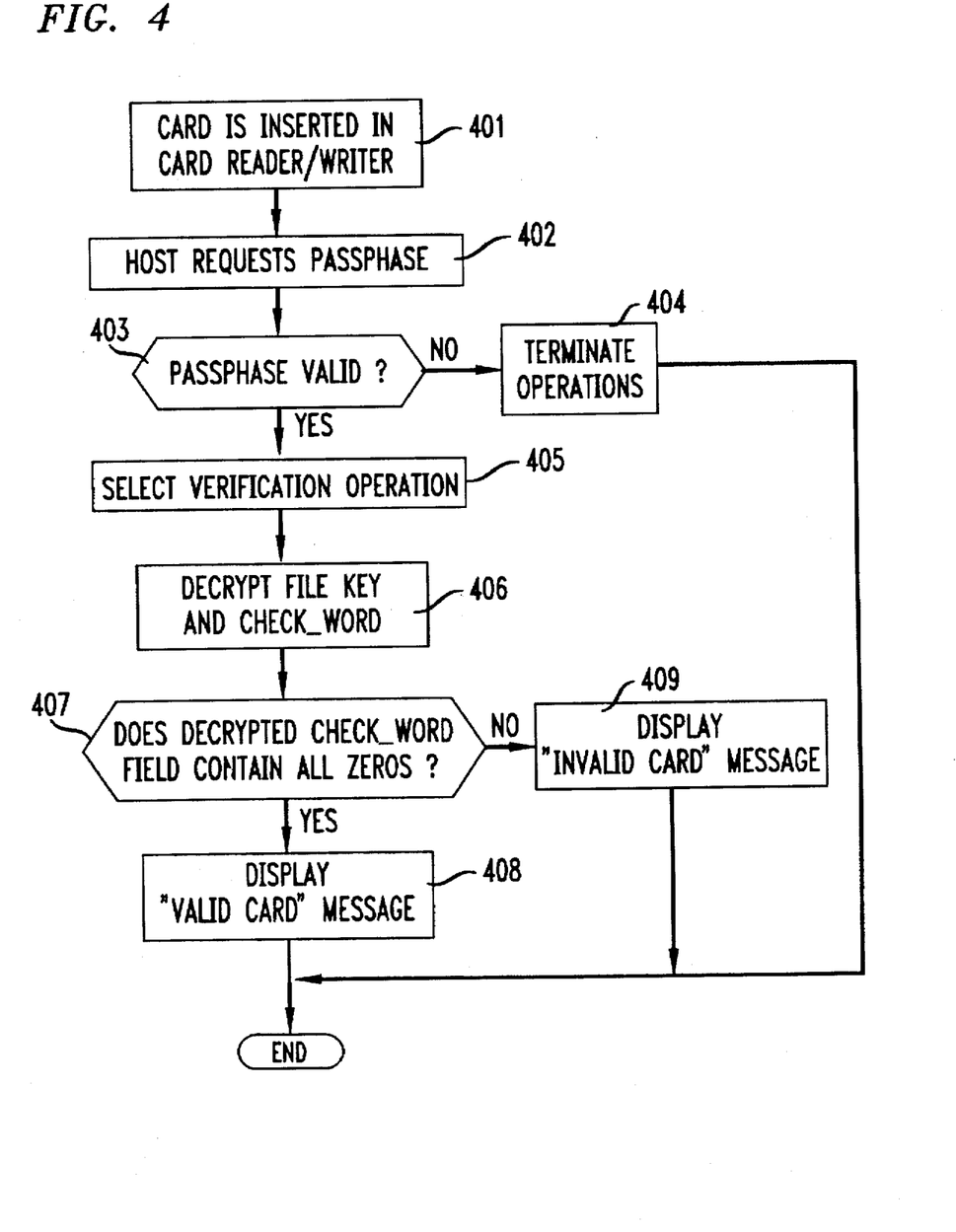

Once smartcard 20 has been initialized, it is ready to be used by an escrow agent who is entrusted with a passphrase. As additional safeguards, the programmed instructions that are contained in verification function storage area 207 permit the escrow agent to confirm that the keys contained in storage key storage area 202 correspond to those used to encrypt the actual file system. FIG. 4 is a step-by-step method which illustrates this mode of operation. This method is initiated in step 401 when smartcard 20 is inserted in card reader/writer 30. In step 402, host 42 requests a passphrase to ascertain the identification of the escrow agent. When a passphrase is provided, a determination is made in step 403 as to its validity. This is accomplished by matching the passphrase provided by the escrow agent to the one stored in smartcard 20 or encrypted file system 50. When no match is found, all operations are automatically terminated, as indicated in step 404. If the passphrase is valid, the presentation function described above, is performed and the verification function is selected by the agent, as indicated in step 405. As part of the presentation function, smartcard 20 receives the escrow key and the contents of the encrypted check block field stored in the encrypted file system 50 connected to host 42. Thereafter, smartcard 20, in step 406, decrypts a) the file key under the escrow key, and b) the check_block field previously encrypted during the initialization of smartcard 20. A determination is made in step 407, as to whether the this decrypted value of the check_block field is zero. If the decrypted value of the check_word field is not zero, in step 409, a message indicating that the smartcard is invalid is displayed on monitor 60. If the decrypted value of the check_word field is zero, a message indicative of the validity of smartcard 20 is displayed on monitor 60, as indicated in step 408. For example, a "proceed" message may be displayed on monitor 60.

Figure 5:
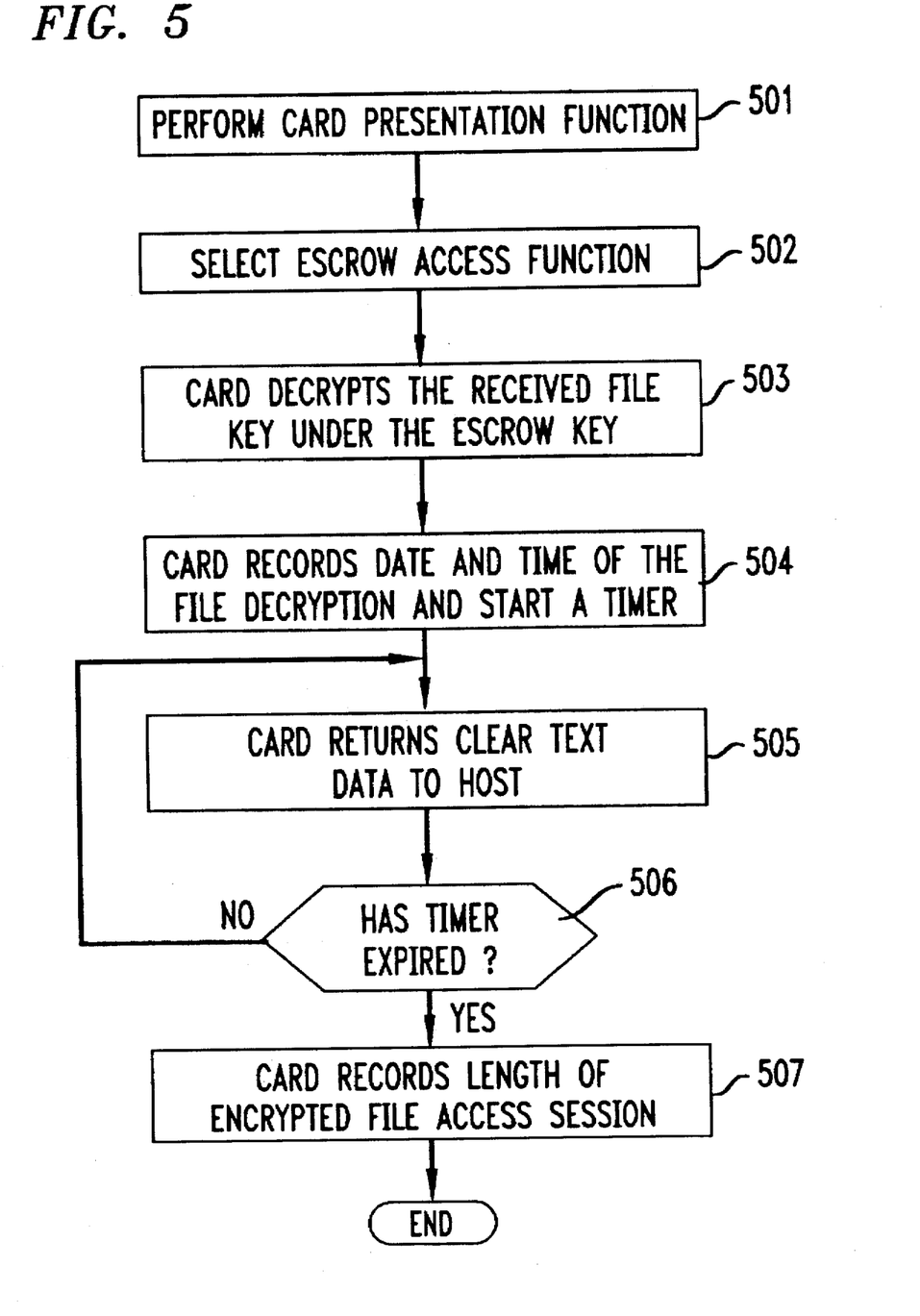

Once smartcard 20 is deemed valid, the smartcard may be used to decrypt one or more files stored in encrypted file system 50. The instructions to perform that task are stored in escrow access function storage area 208 and described as a step-by-step method in FIG. 5. This method is initiated in step 501 when smartcard 20 is inserted in card reader/writer 30 to perform the presentation function described above. After the escrow key provided by the agent has been validated, the encrypted file key is provided to the smartcard by host 42 as part of the presentation function. In step 502, the escrow access function is selected by the escrow agent. Accordingly, in step 503, smartcard 20 decrypts the stored file key previously encrypted under the escrow key. Subsequently, smartcard 20 uses clock 19 in step 504 to a) start a timer, b) ascertain the date and time at which the file decryption occurred, and c) store such time and date in appropriate fields in activity storage area 203. Thereafter, smartcard 20 in step 505, returns the clear text data associated with the file to host 42, and uses microprocessor 22 to count the number of bytes decrypted by the smartcard. Access to clear text data associated with the file continues until the timer expires, as determined in step 506. The timer may expire when an escrow agent logs off host 42 or decides to access non-encrypted files on host 42. When the timer expires, smartcard 20 a) stores in a field of activity storage area 203 the length of time during which the escrow agent had access to the encrypted files stored in encrypted file system 60, and b) the number of bytes decrypted during the session.

Figure 6:
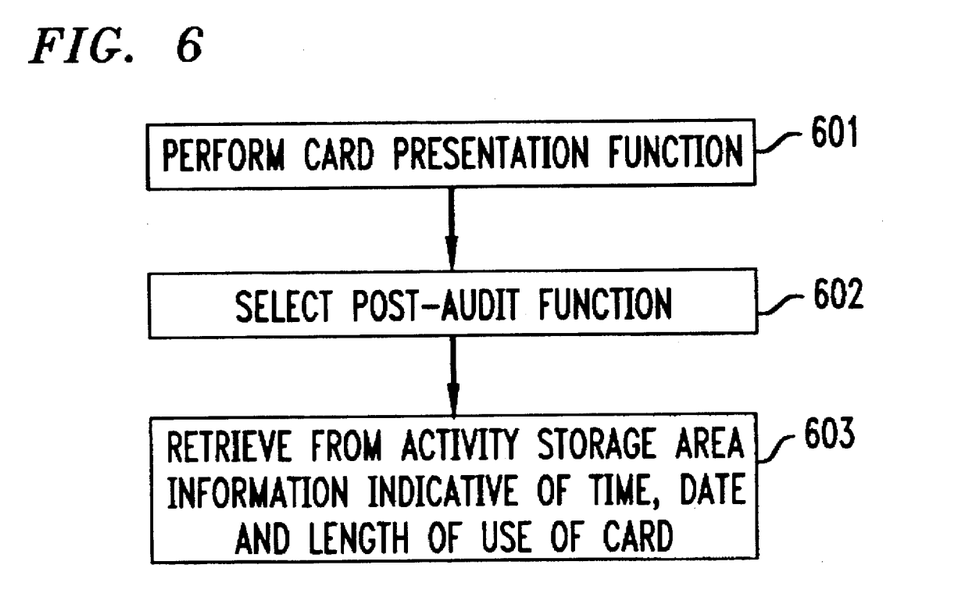

When the escrow period has ended and smartcard 20 has been returned to the owner, it is desirable for the owner to be able to assess when, how many times, and for how long the smartcard was used by the agent. Instructions to perform this task are stored in post-audit function storage area 209 and implemented as a step-by-step method illustrated in FIG. 6. This method is initiated in step 601 when the owner inserts smartcard 20 in card reader/writer 30 to perform the presentation function described above. When in step 602, the owner selects the post-audit function (and optionally a valid audit key is provided), smartcard 20, in step 603, retrieves from activity storage area 203 contents of fields which indicate a) the number of times the escrow keys were used b) the time and date of each session, and c) the number of bytes decrypted under the escrow key for each session. As mentioned above, when multiple escrow keys are used with smartcard 20, the active escrow key is also recorded with all transactional activities.

Advantageously the key escrow management system of the invention allows secure and auditable access to proprietary data. For example, when an employee has primary operational responsibility for data that belongs to an organization, the key escrow system allows the organization to provide other individuals with emergency access capability in the primary employee's absence. Access by these "backup" individuals can be granted, controlled, audited and revoked easily, without compromising the organization's ability to maintain and control its own information.

Smartcard-based escrow also facilitates other backup access relationships. In the organizational scenario above, the primary key holder is "subordinate" to the escrow holder. Alternatively, a manager may be the primary key holder for sensitive-but-critical business data for which the keys are escrowed with an employee. The escrow key holder may not be authorized for routine access, but in the manager's absence may be required to perform "proxy" functions on the manager's behalf. Here, the smartcard system implements and enforces a common business delegation of authority practice.

Another scenario, which may become more important in the future, involves the protection of individual personal records. Consider, for example, a system in which medical records are encrypted under a key known only to the patient. Routine use of these records by a health practitioner requires the patient's active consent in supplying the key. In an emergency, however, access to the records may be required even when the patient is physically unable to supply the key. A key escrow smartcard, which might remain in the physical possession of the patient or be maintained with the records themselves, would enable such emergency access but still permit the patient to control (and revoke) the routine use of his or her private records.

The foregoing is to be construed as only being an illustrative embodiment of this invention. Persons skilled in the art can easily conceive of alternative arrangements providing functionality similar to this embodiment without any deviation from the fundamental principles or the scope of this invention.

I claim:

1. A cryptographic module for accessing encrypted data stored on a computer system, said cryptographic module comprising a memory which stores a first cryptographic key; and scheduling information for use of said cryptographic module; and a processor which is a) coupled to said memory and said computer system, and b) responsive to receiving via a physical interface a cryptographic passphrase provided by a user, decrypts said encrypted data using a second cryptographic key provided by said computer system, and that is associated with said first cryptographic key, said decryption being performed only when i) said cryptographic passphrase compares favorably to said first, cryptographic key and, ii) a determination is made that said cryptographic passphrase is received within a chosen time frame associated with said scheduling information.

2. The invention of claim 1 wherein said processor stores in said memory transactional information indicative of at least one instance of use of the cryptographic module to decrypt said encrypted data.

3. The invention of claim 2 wherein said processor overwrites transactional information previously stored on said cryptographic module to record the most recent instance of use of the cryptographic module.

4. The invention of claim 2 wherein said transactional information includes data indicative of information selected from a group of such information which includes a) time and date for each instance the cryptographic module was used to decrypt the encrypted data, b) amount of information decrypted for each instance of use of the cryptographic module, c) length of time for each instance of use of the cryptographic module, d) number of times the cryptographic module was used to decrypt said stored encrypted data, and e) a summary of times and dates of the usage of the cryptographic module for decrypting said encrypted stored data.

5. The invention of claim 1 wherein said scheduling information includes parameters for use of said cryptographic module, said parameters including a) the chosen time frame within which said cryptographic module is able to decrypt the encrypted data, b) a date interval within which said cryptographic module is able to decrypt the encrypted data, and c) a limited number of times said cryptographic module can be used to decrypt the encrypted data.

6. The invention of claim 1 wherein said cryptographic module is a smartcard.

7. A method of providing access to encrypted data stored in a computer system, said method comprising the steps of:

receiving a cryptographic passphrase at a portable cryptographic module which has a processor designed to a) compare said cryptographic passphrase to a first cryptographic key which is stored in a memory of said cryptographic module and b) allow access to the encrypted data only during a selected time frame;

decrypting encrypted data retrieved from said computer system using a second cryptographic key that is received from said computer system and that is associated with said first cryptographic key, said decryption being performed only when a) said cryptographic passphrase favorably compares to said first cryptographic key, and b) said cryptographic passphrase is received within said selected time frame.

8. The method of claim 7 further comprising the step of:

storing in the memory of the cryptographic module transactional information associated with performance of said decrypting step.

9. The method of claim 8 further comprising the step of;
auditing use of said cryptographic module by retrieving at a later time said transactional information.

10. The method of claim 8 or 9 wherein more than one cryptographic phrase is assigned to the cryptographic module and wherein said invention further comprises the step of:
limiting the scope of use of the cryptographic modules to one or more functions for each cryptographic passphrase, said functions being selected from a group of functions which include said decrypting and said auditing.

11. The method of claim 8 wherein said transactional information includes data indicative of at least one of a) time and date at which the cryptographic module was used to decrypt the encrypted data files, b) amount of information decrypted for each instance of use of the cryptographic module, c) length of time for each instance of use of the cryptographic module, d) number of times the cryptographic module was used to decrypt said stored encrypted data, and e) a summary of times and dates of the usage of the cryptographic module for decrypting said encrypted stored data.

12. The method of claim 7 further comprising the step of:
authenticating the cryptographic module after it has been used at least once to decrypt said encrypted data.

13. A method of managing access to one or more encrypted data files, said method comprising the steps of:
assigning at a data file system a cryptographic key to a cryptographic module which is entrusted to a selected user;
storing in a memory of the cryptographic module a) access information allowing use of the cryptographic module by the selected user under specific conditions, said access information including the cryptographic key, at least one corresponding cryptographic passphrase and b) a software program to decrypt the one or more encrypted data files;
permitting decryption of said one or more encrypted data tries by the cryptographic module when the selected user provides the cryptographic passphrase corresponding to the autographic key under the specific conditions; and
querying said cryptographic module to retrieve transactional information recorded on said autographic module after at least one instance of use of the cryptographic module to decrypt said encrypted data by the selected user.

14. The method of claim 13 wherein said cryptographic module is disabled if said specific conditions are not met.

15. The method of claim 13 wherein said specific conditions are selected from a group of conditions which include a) a time frame within which said cryptographic module is functional, b) date interval within which said cryptographic module is functional, and c) number of times said cryptographic module.

16. A system for managing access to one or more encrypted data files stored in a computer system, said system comprising:
a file of the computer system which associates a cryptographic key with a cryptographic module that is subsequently assigned to a selected user;
a memory of the cryptographic module which stores a) access information allowing use of the cryptographic module by the selected user under specific conditions, said access information including the cryptographic key, a corresponding cryptographic passphrase and a software program to decrypt the one or more encrypted data files;
means responsive to receiving at said cryptographic module said corresponding cryptographic passphrase from said selected user, for a) permitting decryption of said one or more data flies when the specific conditions are met, and b) recording in said memory transactional information associated with said decryption, and b) uses said cryptographic module for the purpose of decrypting one or more of said data files; and
means for querying at a later time said cryptographic module to retrieve said transactional information recorded on said memory.

17. The system of claim 16, wherein said cryptographic module is disabled if said specific conditions are not met.

18. The method of claim 16 wherein said specific conditions are selected from a group of conditions which include a) a time frame within which said cryptographic module is functional, b) a date interval within which said cryptographic module is functional, and c) a limited number of times said cryptographic module is usable.

* * * * *